United States Patent
Hauber et al.

(10) Patent No.: US 9,486,980 B2
(45) Date of Patent: Nov. 8, 2016

(54) METHOD FOR CONSTRUCTING COMPOSITE BUILDING BOARDS USING DISSOLVABLE FILMS

(71) Applicant: CertainTeed Gypsum, Inc., Tampa, FL (US)

(72) Inventors: Robert J. Hauber, Land O Lakes, FL (US); Gerald D. Boydston, Cody, WY (US)

(73) Assignee: CertainTeed Gypsum, Inc., Tampa, FL (US)

( * ) Notice: Subject to any disclaimer, the term of this patent is extended or adjusted under 35 U.S.C. 154(b) by 686 days.

(21) Appl. No.: 13/854,443

(22) Filed: Apr. 1, 2013

(65) Prior Publication Data

US 2013/0299059 A1    Nov. 14, 2013

Related U.S. Application Data

(63) Continuation of application No. 12/794,959, filed on Jun. 7, 2010, now Pat. No. 8,409,391.

(51) Int. Cl.
*B32B 5/02* (2006.01)
*B28B 19/00* (2006.01)
*B28B 23/00* (2006.01)
(Continued)

(52) U.S. Cl.
CPC .......... *B32B 5/022* (2013.01); *B28B 19/0092* (2013.01); *B28B 23/0006* (2013.01); *B32B 37/24* (2013.01); *B32B 38/10* (2013.01); *B32B 2305/28* (2013.01); *B32B 2315/085* (2013.01); *B32B 2315/18* (2013.01); *Y10T 156/10* (2015.01); *Y10T 156/1052* (2015.01); *Y10T 156/1056* (2015.01); *Y10T 156/1057* (2015.01); *Y10T 156/1062* (2015.01); *Y10T 156/1084* (2015.01)

(58) Field of Classification Search
USPC .......................................................... 156/45
See application file for complete search history.

(56) References Cited

U.S. PATENT DOCUMENTS 4,265,979 A    5/1981    Baehr et al.
4,378,405 A    3/1983    Pilgrim
(Continued)

FOREIGN PATENT DOCUMENTS

CA    2070489 A1    12/1993

OTHER PUBLICATIONS

Celvol.RTM. Polyvinyl Alcohol—Solution Preparation Guidelines, Guidelines [online]. Sekisui Specialty Chemicals America, LLC http://www.celvol.com/sekisui/home/htm. Dec. 21, 2009 [retrieved on Sep. 15, 2011]. Retrieved from the internet: <URL: http://www.celvol.com/sekisui/files/solution.sub.--preparation.sub.--guid-e.sub.--pvoh.sub.--1060.pdf>, pp. 14.

*Primary Examiner* — Lynda Salvatore
(74) *Attorney, Agent, or Firm* — GrayRobinson, P.A.; Michael J. Colitz, III

(57) ABSTRACT

Disclosed are building board manufacturing techniques that minimize the build-up of slurry on associated forming equipment and also produce panels with enhanced physical properties. The methods involve applying a dissolvable film laminate to one or more fiber mats at the outset of the forming process. In the un-dissolved state, the film acts as a containment envelope for the gypsum slurry and any free floating glass fibers. During subsequent curing, the film is dissolved by vaporized water. In its dissolved state, the film is liquefied and coats the fibers of the underlying mat. This results in a building board with improved physical properties.

14 Claims, 3 Drawing Sheets

(51) Int. Cl.
  *B32B 37/24* (2006.01)
  *B32B 38/10* (2006.01)

(56) References Cited

U.S. PATENT DOCUMENTS

| | | |
|---|---|---|
| 4,696,847 A | 9/1987 | Cousin et al. |
| 6,524,679 B2 | 2/2003 | Hauber et al. |
| 6,878,321 B2 | 4/2005 | Hauber et al. |
| 8,409,391 B2 | 4/2013 | Hauber et al. |
| 2002/0187296 A1 | 12/2002 | Hauber et al. |
| 2005/0202742 A1* | 9/2005 | Smith .............. B28B 19/0092 442/256 |
| 2006/0035032 A1 | 2/2006 | Murphy et al. |
| 2009/0087616 A1 | 4/2009 | Hennis et al. |
| 2010/0055431 A1 | 3/2010 | College |

\* cited by examiner

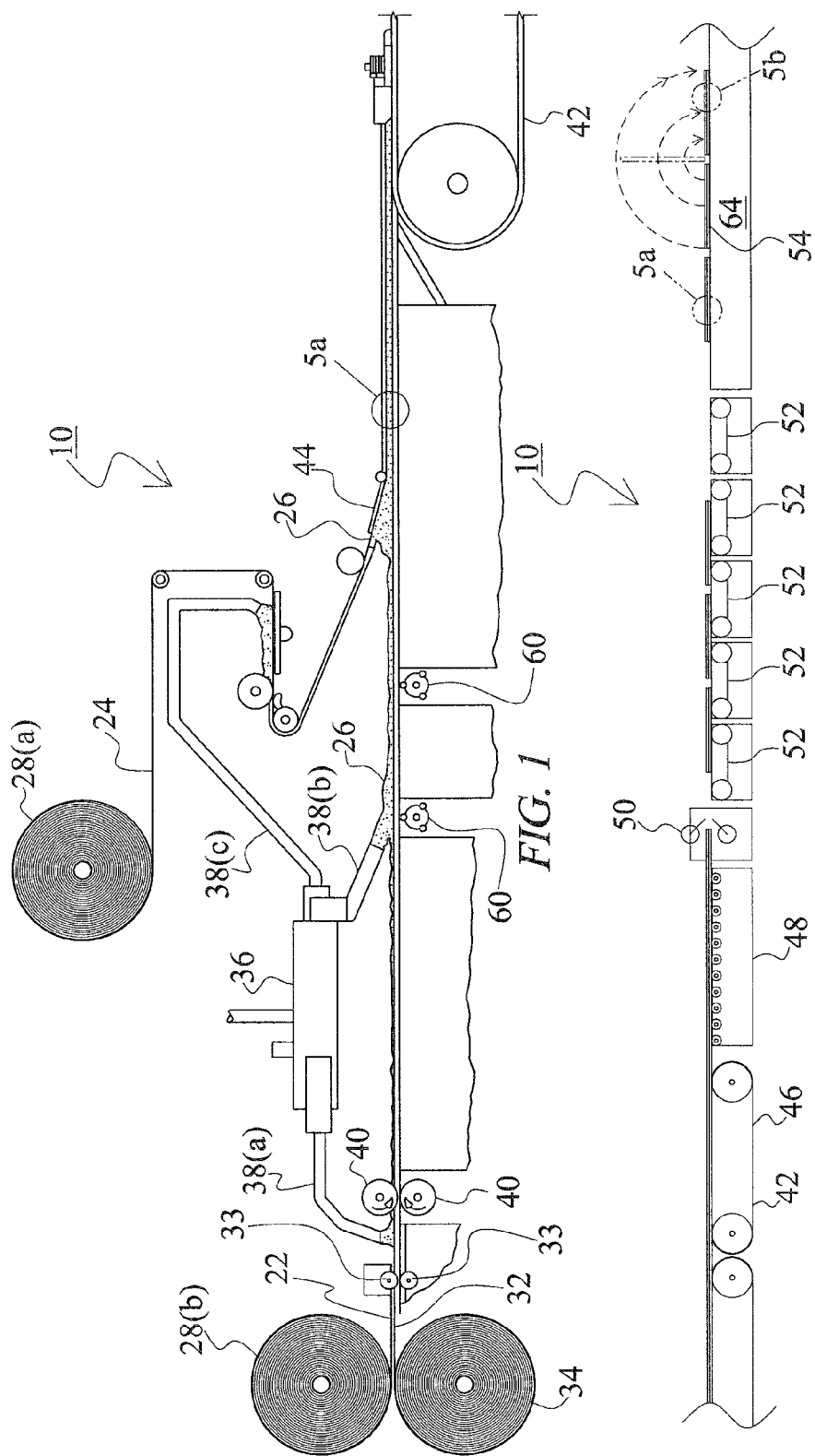

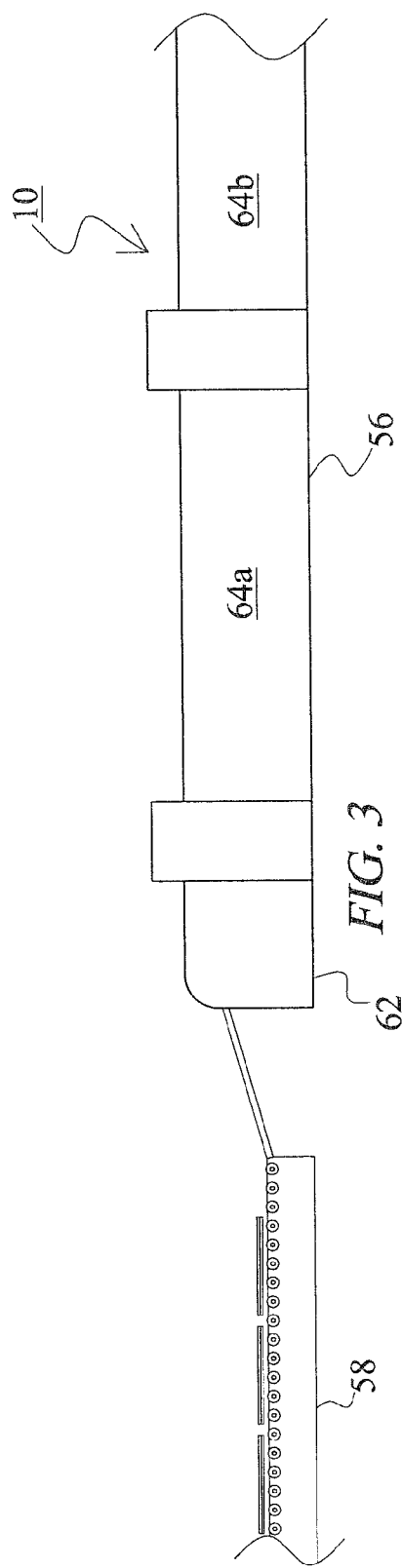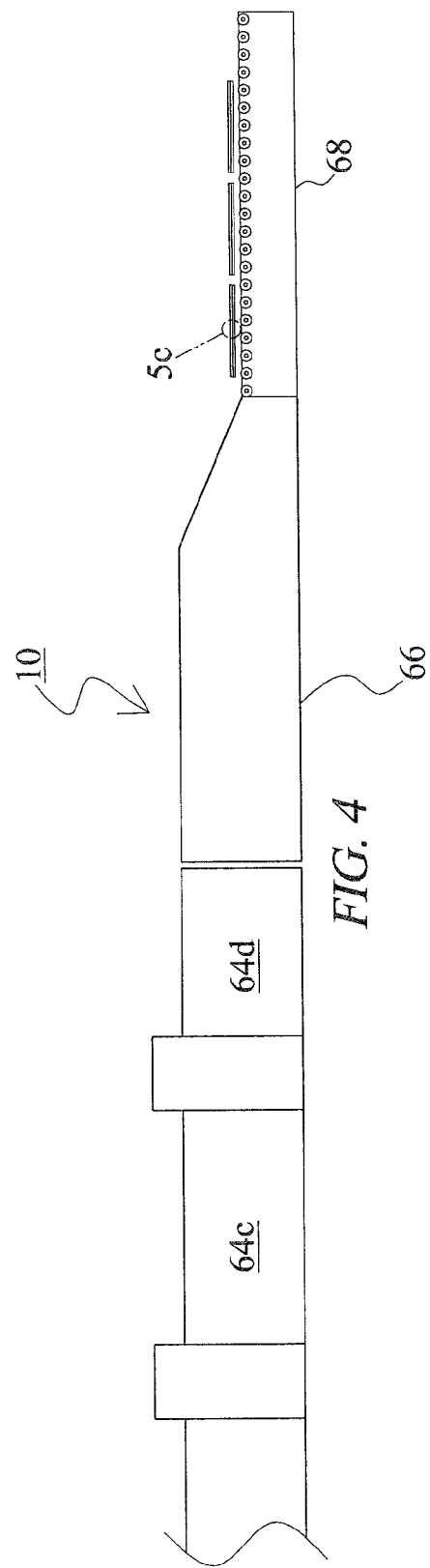

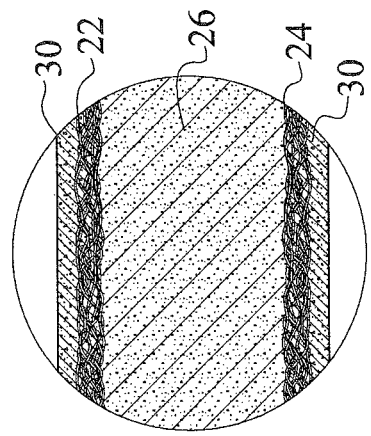
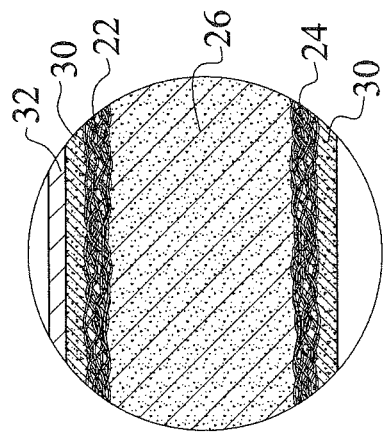
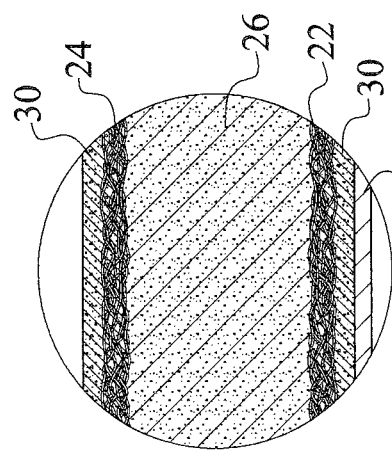

METHOD FOR CONSTRUCTING COMPOSITE BUILDING BOARDS USING DISSOLVABLE FILMS

CROSS REFERENCE TO RELATED APPLICATIONS

This application claims priority to and is a continuation of application Ser. No. 12/794,959 filed on Jun. 7, 2010, and entitled "Method for Constructing Composite Building Boards using Dissolvable Films." The contents of this co-pending application are fully incorporated herein for all purposes.

BACKGROUND OF THE INVENTION

1. Field of the Invention

This invention relates to a method for constructing composite building boards. More particularly, the present invention relates to the use of dissolvable films in the construction of composite gypsum building boards.

2. Description of the Background Art

Building board, also known as wallboard, plasterboard, or drywall, is one of the most commonly used building components in the world today. Building board is frequently used within the interior of a dwelling, where it functions both as a finished wall covering and as a structural room partition. Building board can also be used on the exterior of a dwelling, where it serves as a sheathing to provide weather protection and insulation. Building board can also be used as an interior facing for other structures as well, such as stairwells, elevator shafts, and interior ducting.

One particularly popular form of building board is known as glass reinforced gypsum (GRG) board. An example of one such board is disclosed in U.S. Pat. No. 4,265,979 to Baehr et. al. Baehr discloses a building board constructed from opposing glass fiber mats with an intermediate gypsum core. This construction provides a hardened external surface and is an improvement over earlier paper faced boards.

Current GRG manufacturing techniques have some significant drawbacks. Namely, during construction, some of the individual mat fibers are not covered by the gypsum slurry core and are therefore exposed. These fibers have a tendency to dry out and disengage from the board. As a result, free floating glass fibers tend to accumulate on and damage associated forming equipment, such as forming tables, forming plates, motor drives, bearings, and the like. The presence of disengaged fibers also presents a significant hazard to workers who must wear appropriate safety masks so as not to ingest the fibers. The most common way to combat this problem is through the use of expensive dust collection equipment and/or the periodic and repeated cleaning of the forming equipment.

A subsequent board manufacturing technique is described in commonly owned U.S. Pat. No. 4,378,405 to Pilgrim. The contents of the Pilgrim patent are fully incorporated herein by reference. Pilgrim discloses a GRG board that is faced on one or both sides with a porous, nonwoven glass mat. The glass mat of Pilgrim is slightly embedded into the slurry core. This is accomplished by vibrating the gypsum slurry to cause it to pass through the porous openings in the mat. Embedding the mat within the core as taught in Pilgrim results in a thin film of slurry being formed on the outer surface of the board. Building boards with this construction are referred to as embedded glass reinforced gypsum (EGRG) boards.

EGRG boards eliminate, or greatly reduce, the presence of exposed fibers and greatly reduce the presence of free floating fibers. However, the construction of EGRG boards also has its drawbacks. Namely, EGRG boards require the application of large amounts of gypsum slurry. This slurry leaks from the boards during manufacture and accumulates on associated forming equipment. Thus, during manufacture, the forming tables, forming belts, and associated rollers and motors are exposed to substantial build-ups of gypsum slurry. Over time, if not repeatedly cleaned, the manufacturing process comes to a complete stop. Thus, in traditional GRG and EGRG building board manufacturing techniques there is a substantial capital investment in equipment designed to clean the forming areas.

Additionally, even in the construction of EGRG boards, there is a continuing problem with some fibers becoming exposed, dried and detached. This, in turn, results in the accumulation of free fibers on the forming tables, forming belts and associated rollers and motors. As with the excess gypsum slurry, these fibers must be removed in order to prevent downtime.

During the drying of GRG boards, excess water in the gypsum core is boiled off and passes through the facing mats. These vapors serve to breakdown and weaken binders within the mats and surrounding core. This, in turn, releases silica-based granules that are likewise damaging to forming tables, forming belts, and associated rollers and motors. This, too, leads to the need for periodic cleaning and maintenance.

Thus, there exists a need in the art for improved building board manufacturing techniques. More specifically, there is a need in the art for manufacturing techniques that minimize the acumination of gypsum slurry and/or free floating fibers on associated forming equipment. There also exists a need to minimize capital investment needed to construct GRG and EGRG building boards. There is yet another need to economically produce GRG and EGRG building boards with improved physical characteristics. The present invention is aimed at achieving these objectives.

SUMMARY OF THE INVENTION

It is therefore one of the objectives of this invention to manufacture building boards in a way that minimizes the accumulation of slurry on associated forming equipment.

It is also an object of this invention to construct fiber reinforced building boards via techniques that minimize and/or eliminate the presence of exposed and/or free floating fibers.

It is still yet another object of this invention to utilize a dissolvable film during the manufacture of building boards.

Another object of this invention is to use a dissolvable film in the construction of building boards, where in the un-dissolved state, the film acts as a containment envelope for slurry and glass fibers.

Still yet another object of this invention is to use a dissolvable film in the construction of building boards, where the dissolved film improves the physical properties of the resulting building board.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which:

FIG. 1 is an elevational view of the first part of the manufacturing process wherein the slurry is applied to fiber mats;

FIG. 2 is an elevational view of the second part of the manufacturing process wherein the building boards are cut and flipped;

FIG. 3 is an elevational view of the third part of the manufacturing process wherein the building boards are delivered into a series of dryers;

FIG. 4 is a cross section of the fourth part of the manufacturing process wherein the building boards exit with a previously applied film dissolved;

FIG. 5A is a detailed cross section of the building board taken from FIGS. 1 and 2.

FIG. 5B is a detailed cross section of the building board taken from FIG. 2.

FIG. 5C is a detailed cross section of the building board taken from FIG. 4.

Similar reference characters refer to similar parts throughout the several views of the drawings.

DETAILED DESCRIPTION OF THE PREFERRED EMBODIMENT

The present disclosure relates to building board manufacturing techniques that minimize the build-up of slurry on associated forming equipment and that also produce panels with enhanced physical properties. The method involves applying a dissolvable film to one or more fiber mats at the outset of the forming process. In the un-dissolved state, the film acts as a containment envelope for the slurry and any free floating glass fibers. During subsequent curing, the film dissolves when heated and by the passage of vaporized water through the film. In its fully dissolved state, the film coats any exposed fibers and sinks down into the slurry core. This eliminates exposed fibers and produces building boards with enhanced physical properties. The disclosed method can be utilized in the production of GRG or EGRG boards.

The present method is carried out via a building board production line 10. The various sections of this line are sequentially illustrated in FIGS. 1-4. The various components of the building boards are assembled in the first stage illustrated in FIG. 1. As is known in the art, conventional GRG/EGRG building boards are formed from one or more glass fiber mats that are lined with a gypsum slurry. In the depicted embodiment, first and second glass fiber mats (22 and 24, respectively) are adhered to opposing sides of a slurry core 26. Slurry core 26 is preferably formed from a gypsum slurry. Mats 22 and 24 are dispensed from upper and lower rolls (28(a) and 28(b), respectively).

The mats are preferably constructed from a series of nonwoven, randomly aligned glass fibers. The mats are also preferably pre-coated with an organic or inorganic resin binder to hold the individual fibers together. However, the disclosed method can be carried out with a variety of other mat constructions. For instance, the mats can be formed from woven or nonwoven filaments of organic and/or inorganic fibers. Continuous or non-continuous filament fibers can likewise be used. Additionally, the mats can be supplied uncoated, with the resin binder being applied at a point along the production line 10.

As illustrated in FIG. 1, the lower glass mat 22 is supplied to a forming table via lower mat roll 28(b). FIG. 1 also illustrates a film 32 being adhered to the underside of lower glass mat 22 prior to application of gypsum slurry 26. Glass mat 22 is referred to as being the "lower" glass mat in that it is initially beneath the upper mat 24 during the assembly process. However, it is understood that during subsequent processing mat 22 is cut into individual boards, which are then inverted or flipped. As such, lower glass mat 22 eventually becomes an upper glass mat 22; namely, after being flipped, mat 22 is oriented over mat 24. Additionally, although underlying film 32 initially faces the forming table, it is eventually exposed after the board is flipped.

A variety of materials can be used for film 32. In the preferred embodiment, film 32 is a water soluble, synthetic polymer, such as a Polyvinyl Alcohol ("PVOH"). PVOH films are preferred because they are temperature sensitive, reactive to water, and gas permeable during phase change, and heat curable. In the preferred embodiment, PVOH film 32 is between approximately 0.5 and 2.5 mils thick. By way of non-limiting example, a PVOH film 32 having a thickness of approximately 1.8 mil is preferred. One suitable PVOH film is made by Monosol® of Portage, Ind. Other water and/or heat dissolvable films can be utilized by the present method. For example, certain water dissolvable polyethylene-based composite films produced by Aicello Chemical Co., Ltd. of Toyohashi, Japan have been found to be acceptable. Alternatively, heat dissolvable films may also be used such as certain Ethylene Vinyl Alcohol ("EVA") films. Still yet other films that dissolve in the presence of heat and/or water may suffice.

The film 32 is stored in a roll 34 and is applied via a slip sheet. Proper adherence is achieved by delivering mat 22 and film 32 through opposing hot laminating rollers 33. It is preferred that the width of film 32 be equal or slightly greater than to the width of glass mat 22 to ensure that the entire undersurface of glass mat 22 is covered by film 32. After being passed through the hot laminating rollers 33, film 32 preferably has a tackiness that assists in adhering film 32 to mat 22. Alternatively, film 32 is formed from a material that does not interfere with proper adherence between film 32 and mat 22. The tackiness of film 32 also assists in adhering the upper mat 24 to the folded edges of lower mat 22 during subsequent processing as described below. As noted hereinafter, upper mat 24 may or may not include a film layer 32.

Film 32 can also be adhered to mat 22 by way of a heat activated adhesive. This adhesive can be applied to mat 22 prior to unrolling the mat 22 in the gypsum board manufacturing process. This would allow film 32 to be laminated to mat 22 via a simple low cost heated roller or compression nip. Suitable adhesives include a hot melt polyolefin adhesives. Ethylene vinyl acetate (EVA) adhesives can likewise be used. Organic and/or inorganic cold thermal setting or hot applied thermoplastic adhesives can likewise be utilized.

Alternatively, film 32 can be coated with a suitable heat activated adhesive along production line 10 prior to film 32 being secured to mat 22. The preferred adhesive in this instances would be a tacky adhesive with a long open time. In still yet another embodiment, film 32 could be laminated to glass mat 22 prior to in-plant use. Namely, mat 22 would be received by the plants with film 32 already laminated to it.

Once film 32 is laminated to mat 22 one or more layers of gypsum slurry 26 are then applied to the upper surface of lower mat 22. In the depicted embodiment, a mixer 36 supplies a series of gypsum slurry layers to mat 22. In the depicted embodiment, slurry 26 is supplied from mixer 36 via outlets 38(a), 38(b), and 38(c). The first slurry layer is supplied via outlet 38(a). The slurry can be applied at varying densities, and/or with varying additives, from the different outlets 38(a), 38(b), and 38(c). A similar slurry application technique is described in commonly owned U.S. Pat. No. 6,878,321 to Hauber et. al. and entitled "Method of Manufacture of Glass Reinforced Gypsum Board and Apparatus Therefor." The contents of this commonly owned patent are fully incorporated herein.

Prior to the application of slurry at outlet 38(a), the edges of mat 22, along with the secured film 32, can be folded upwardly via crimping rollers to create a containment envelope at the edges of the board. This prevents, or greatly lessens, the amount of slurry that leaks from the sides of the board during subsequent processing. A suitable edge folding mechanism is disclosed in commonly owned U.S. Pat. No. 6,524,679 to Hauber. The contents of this patent are fully incorporated herein.

In the production of EGRG boards, after slurry is supplied at outlet 38(a), mat 22 passes through a pair of opposing roller coaters 40. Roller coaters 40 function in assuring that slurry 26 penetrates glass mat 22 and coats the individual fibers. During this penetration, film 32 functions as a containment envelope and prevents slurry from leaking through the bottom of mat 22 and contaminating the underlying forming table. Roller coaters 40 also ensure that a dense slurry layer 30 is formed between lower mat 22 and film 32 (note FIG. 5a). The slurry density achieved by roller coaters 40 is greatly improved via the containment functions of the film 32 and folded edges. The increased density, in turn, allows for better slurry penetration and the near total embedment of mat fibers.

However, the method disclosed herein can also be utilized in the production of GRG boards, such as the boards disclosed in U.S. Pat. No. 4,265,979. In this embodiment, gypsum core 26 is applied over top of mat 22 but does not fully penetrate mat 22. This lack of penetration results in voids being present along the boundary of film 32 and underlying mat 22. Some of these voids are subsequently filled with slurry from core 26. However, because mat 22 is not fully embedded, some voids are present in the finished board. This results in a board with less adherence and a looser bond between film 32 and mat 22.

After the application of slurry at outlet 38(a), and as illustrated in FIG. 1, a forming belt 42 transports the partially formed board to a second slurry outlet 38(b) where a second layer of gypsum slurry 26 is applied directly over the first layer. As noted above, slurry supplied by outlet 38(b) is preferably less dense than the slurry provided at outlet 38(a). Vibrators 60 underlying the forming table can be employed to remove any air voids and to ensure mat 22 is completely embedded within slurry 26. This second layer forms the major part of the slurry core 26. During the application of slurry, in multiple layers or otherwise, the un-dissolved film laminate 32 continues to act as a containment envelope to prevent slurry from leaking onto the underlying forming equipment.

With continuing reference to FIG. 1, an upper glass fiber mat 24 is applied to the exposed slurry to form a composite panel. Upper glass mat 24 is supplied from an additional glass mat roll 28(a) and associated guide rollers. In the disclosed embodiment, mats 22 and 24 have an identical construction. However, depending upon the desired application, it is within the scope of the present invention to use differing constructions for mats 22 and 24. It is also within the scope of the present invention to employ a PHOV film 32 overtop of mat 24. Such a film would be applied prior to mat 24 being delivered to associated roller coaters and would otherwise be adhered in a fashion similar to the application of film 32 to mat 22 as described above. However, in the preferred embodiment depicted in FIGS. 1-5, film 32 is limited to lower mat 22.

A layer of slurry is thereafter applied to the face of mat 24 via slurry outlet 38(c). Slurry from outlet 38(c) can be applied at a separate forming table if desired. Again, slurry from outlet 38(c) can have a higher density than the slurry from outlet 38(b). As described above in connection with EGRG board production, roll coaters can be used to force the slurry through mat 24 to create a thin surface layer of slurry 30.

Upper mat 24 (with or without an adhered film layer 32) is then delivered via transfer rollers over top of slurry core 26 and the lower mat 22 to form a composite panel. In the event edges of mat 22 are folded, the lateral edges of mat 24 are adhered to the folded edges of mat 22, with the tackiness of film 32 functioning as an adhesive. Alternatively, an adhesive can be applied between the lateral edges of mat 24 and the folded edges of mat 22.

The composite panel is then delivered to a forming plate 44. Forming plate 44 further compacts the applied slurry and constrains the panel to a desired thickness. During this process, additional slurry is forced through and over underlying mat 22. Excess slurry is prevented from contacting the underlying forming belt 42, associated drives, bearings, and other surfaces by the way of the un-dissolved film 32. Film 32 continues to perform this containment function as the board travels along the various stages of production line 10.

Next, as illustrated in FIG. 2, forming belt 42 routes the panel to a roller section 48 and an associated cutting station. At the cutting station, knifes 50 cuts the panel into a number of discrete building boards of a desired length. The building boards can be cut into any length that is desired for various purposes. The individual boards are then passed along accelerator belts to a flipping table 54. At flipping table 54, the individual building boards are turned over. As a result, film 32 underlying lower (or first) glass mat 22 is exposed (compare FIGS. 5a and 5b). Likewise, upper (or second) glass mat 24 and covering gypsum layer 30 are placed in facing relation with the forming belt 42 following flipping table 54.

As noted in FIG. 3, a transfer table 58 delivers the individual boards to the infeed section 62 of the first dryer zone 64(a). It is important to maintain the integrity of film 32 prior to the boards being delivered to the infeed section 62 of dryers 64. Namely, film 32 should remain non-porous as the boards are being transferred and flipped. Maintaining film integrity ensures that wet slurry does not come into contact with the forming equipment as noted above.

Thereafter, as is conventional in the manufacture of gypsum building products, a series of dryers are utilized to heat the gypsum within the panels and vaporize any non-crystalline water. In the depicted embodiment, there are four dryer zones 64(a), 64(b), 64(c) and 64(d). However, the number of dryer zones employed is not critical to the present invention. Dryers 64 are designed to heat the building boards to a degree sufficient to cure the gypsum. This is typically achieved at a temperature of approximately 212° F. The presence of entrained water within the gypsum core will generally prevent the temperature of the gypsum core from raising above 212° F. Dryers 64 of the depicted embodiment utilize a conventional construction and run at temperature levels that range anywhere between approximately 650° F. to 180° F., which is typical for gypsum drying operations.

As a result of this heating process, water is vaporized and delivered upwardly through film 32. PVOH films are advantageous because they become porous when heated, thereby allowing water vapor to escape and avoiding blistering. The escaping water vapor, and the exothermic nature of gypsum rehydration, also furthers the dissolution of the PVOH film. Thus, the dissolution characteristics of PHOV films are dependent upon time and exposure to heat and water vapor. In the context of a board dryer, PVOH films start to become permeable at approximately 60° F. and achieve total permeability at approximately 212° F. Other films can be chosen to achieve total film dissolution at between 110° F. and 120° F. Films that have no dissolution state, or that are less porous, are not desirable because they do not adequately allow for the passage of vaporized water and therefore result in blistering.

The passage of water vapor through film 32 serves to liquefy the film 32. This, in turn, results in the liquefied PVOH film melting downwardly over mat 22 (note FIG. 5c). Embedding mat 22 within core 26 serves to coat most, but not all, of the exposed fibers of mat 22. Any fibers left exposed after embedment are subsequently completely coated by dissolved film 32. This prevents the disengagement of loose fibers.

The dissolved PVOH film also sinks into the face of the board and is partially absorbed by gypsum core 26. After film 32 has been absorbed, the PVOH film 32 may chemically bond with other polymers additives within core 26. Such bonding may be accomplished during curing. In still yet other embodiments, film 32 includes polymer additives that bond to additives within gypsum core 26. These additives can be selected to enhance any of a variety of physical properties and may impart, for example, increased board strength, water resistance, mold protection, and or ultraviolet protection.

By the end of the fourth dryer zone 64(d), film 32 is completely dissolved. Depending on the composition of film 32, it may be translucent, partially translucent, or opaque upon dissolution. A coloring can also be imparted to the board by way of film 32. The application of the liquefied PVOH film to the panel provides a smoother finish and results in a building board with superior water resistance. In the preferred embodiment, the resulting board has a moisture resistance that meets the American Society of Testing and Materials standard ASTM-C 1177. The resulting board has a smoother texture by virtue of film 32 and therefore exhibits improved bonding to paints and joint compounds.

The method described above utilizes a dissolvable film 32 in the construction of GRG or EGRG building boards. However, the method can also be applied to other building board constructions. Film 32 has primarily been disclosed as a containment envelope with the film integrity being maintained at all points prior to the boards being dried. Namely, film 32 can be adhered to mat 22 via an adhesive, with film 32 being dissolved in the presence of water vapor and at a temperature at or above 212° F. However, the present method also allows for the controlled dissolution of film 32 at any point in the process. For instance, film can be used as a slip sheet between the board and underlying forming table. Film 32 can also be made from materials that dissolve as a result of the exothermic reaction and/or water condensation associated with setting gypsum. More specifically, film 32 can be selected to realize complete film dissolution at any point during the process. This dissolution point can be selected based upon the specific objectives of the manufacturing process. For example, in certain circumstances the gypsum may be cured prior to passage through one or more driers. This may be carried out, for instance, via known ultraviolet (UV) curing processes. In this instance, it would be desirable to affect dissolution of film 32 at an earlier point during the board manufacturing process.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A composite building panel comprising:
   first and second glass fiber mats, each mat having an interior and an exterior surface;
   a dissolvable film adhered to the exterior surface of the first mat, the film being completely dissolvable in the presence of heat and water;
   a gypsum slurry layer with entrained water deposited between the interior surfaces of the first and second mats, the deposited slurry passing through the exterior surface of the first mat but being contained by the adhered film, the entrained water being vaporized when heated;
   wherein the film allows for the passage of the vaporized water, and wherein the film subsequently dissolves in the presence of heat and vaporized water with the dissolved film adhering to the fibers of the first mat to enhance the physical properties of the composite panel.

2. The composite panel as described in claim 1 wherein the fiber mats are each formed from a plurality of randomly aligned glass fibers.

3. The composite panel as described in claim 1 wherein the dissolvable film is formed from a Polyvinyl Alcohol (PVOH).

4. The composite panel as described in claim 1 wherein the dissolvable film is formed from an Ethylene Vinyl Alcohol (EVA).

5. The composite panel as described in claim 1 wherein the dissolvable film is formed from a water soluble, synthetic polymer.

6. The composite panel as described in claim 1 wherein the dissolvable film is a polyethylene-based composite film.

7. The composite panel as described in claim 1 wherein the dissolvable film is between approximately 0.5 and 2.5 mils thick.

8. The composite panel as described in claim 1 wherein the dissolvable film is secured via a heat activated adhesive.

9. The composite panel as described in claim 1 wherein the film Previously becomes liquefied via the passage of the vaporized water.

10. The composite panel as described in claim 1 wherein the dissolved film is partially absorbed by the gypsum slurry.

11. A composite building panel comprising:
    first and second fiber mats, each mat having an interior and an exterior surface;

a dissolvable film adhered to the exterior surface of at least one of the fiber mats, the film being completely dissolvable in the presence of heat or water;

a slurry layer with entrained water deposited between the interior surfaces of the first and second mats, the deposited slurry passing through the exterior surface of the mats but being contained by the dissolvable film;

wherein vaporized water passes through and completely dissolves the film, and wherein the dissolved film adheres to the fibers of the mat to enhance the physical properties of the composite panel.

12. The composite panel as described in claim 11 wherein the dissolvable film is formed from a Polyvinyl Alcohol (PVOH).

13. The composite panel as described in claim 11 wherein the dissolvable film is formed from an Ethylene Vinyl Alcohol (EVA).

14. The composite panel as described in claim 11 wherein the dissolved film is partially absorbed by the gypsum slurry.

* * * * *